United States Patent
Bourge et al.

(10) Patent No.: US 7,778,330 B2
(45) Date of Patent: Aug. 17, 2010

(54) METHOD OF MEASURING BLOCKING ARTEFACTS

(75) Inventors: Arnaud Bourge, Paris (FR); Jorge Caviedes, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1474 days.

(21) Appl. No.: 10/536,846

(22) PCT Filed: Nov. 24, 2003

(86) PCT No.: PCT/IB03/05420

§ 371 (c)(1),
(2), (4) Date: May 31, 2005

(87) PCT Pub. No.: WO2004/052019

PCT Pub. Date: Jun. 17, 2004

(65) Prior Publication Data

US 2006/0093227 A1    May 4, 2006

(30) Foreign Application Priority Data

Dec. 4, 2002    (FR)    .................................. 02 15292

(51) Int. Cl.
*H04N 7/12*    (2006.01)
*G06K 9/46*    (2006.01)
(52) U.S. Cl. .................................... 375/240.2; 386/236
(58) Field of Classification Search .............. 375/240.2, 375/240.16, 240.27, 240.12; 382/236, 268; 708/203
See application file for complete search history.

(56) References Cited

U.S. PATENT DOCUMENTS

| 5,590,064 | A  | * | 12/1996 | Astle  | ............................. | 708/203 |
| 6,631,162 | B1 | * | 10/2003 | Lee et al. | ................ | 375/240.16 |
| 6,643,410 | B1 | * | 11/2003 | Yu et al. | ....................... | 382/268 |
| 6,823,089 | B1 | * | 11/2004 | Yu et al. | ....................... | 382/268 |
| 7,020,207 | B1 | * | 3/2006  | Tavares | .................. | 375/240.27 |

(Continued)

FOREIGN PATENT DOCUMENTS

EP    1202577 A1    5/2002

(Continued)

OTHER PUBLICATIONS

H. R. Wu, et al: A Generalized Block-Edge Impairment Metric for Video Coding, vol. 4, No. 11, Nov. 1997, pp. 317-320, IEEE SIGNAL.

*Primary Examiner*—Gims S Philippe (57) ABSTRACT

The invention relates to a method of measuring blocking artefacts on the basis of video data encoded in accordance with a block encoding technique. This method comprises a step of computing a monodimensional inverse discrete transform (31) of a first row of a first block of encoded video data, suitable for supplying a value of a first virtual border pixel (vep1). It also comprises a step of computing a monodimensional inverse discrete transform (32) of a first row of a second block of encoded video data, the second block being adjacent to the first block, suitable for supplying a value of a second virtual border pixel (vep2). Finally, the method comprises a step of computing (33) a blocking artefact level (VEP-L) on the basis of an absolute value of the difference between the values of the first and second virtual pixels. This method finds its application, for example, in video encoders, decoders and transcoders.

12 Claims, 5 Drawing Sheets

U.S. PATENT DOCUMENTS 7,027,654 B1 *   4/2006   Ameres et al. .............. 382/236
7,266,149 B2 *   9/2007   Holcomb et al. ........ 375/240.12

FOREIGN PATENT DOCUMENTS

| EP | 1202577 | A9 | 5/2002 |
| EP | 1202577 | B1 | 5/2002 |
| WO | WO0120912 | A1 | 3/2001 |

* cited by examiner

METHOD OF MEASURING BLOCKING ARTEFACTS

FIELD OF THE INVENTION

The invention relates to a method of measuring blocking artefacts on the basis of video data encoded in accordance with a block-based encoding technique.

The invention notably finds its application in video compression, the compression technique being based, for example, on the MPEG standard (Moving Pictures Expert Group), for correcting said blocking artefacts by virtue of, for example, a post-processing operation or an adaptive compression of video data.

BACKGROUND OF THE INVENTION

The video compression algorithms using block-based encoding techniques such as MPEG or H.26x are compression algorithms with loss of information, often leading to a degradation of the visual quality of the sequence of encoded and subsequently decoded images with respect to the sequence of original images.

One of the visual artefacts which are most frequently observed with these encoding techniques is referred to as blocking artefact. This artefact is notably due to the quantization of blocks of coefficients resulting from the discrete cosine transform DCT, which quantization is rougher as the compression rate is higher. As a result, the degradation of the visual quality may range from an imperceptible level for a low compression rate to a level which is very annoying to the viewer for a high compression rate.

International patent application WO 01/20912 (PHF99579) describes a method allowing detection and localization of a grid corresponding to blocking artefacts within a decoded digital image. This method uses a gradient filtering of the pixels of a digital image and, for this reason, necessitates a complete decoding of the encoded data stream comprising the digital images, which renders its use costly in terms of computing resources, notably during transcoding.

European patent application EP 1 202 577 (PHF000106) describes a method of measuring blocking artefacts which is more precise than the method mentioned above. However, this method always necessitates a complete decoding of the encoded data stream comprising the digital images, as well as supplementary direct and inverse discrete cosine transforms, which renders its use also more costly in terms of computing resources than the above-mentioned method.

OBJECT AND SUMMARY OF THE INVENTION

It is an object of the present invention to propose a method of measuring blocking artefacts which is less complex than the one of the prior art while keeping a good efficiency.

To this end, the method of measuring blocking artefacts according to the invention is characterized in that it comprises the steps of:
computing a monodimensional inverse discrete transform of a first row of a first block of encoded video data, suitable for supplying a value of a first virtual border pixel,
computing a monodimensional inverse discrete transform of a first row of a second block of encoded video data, the second block being adjacent to the first block, suitable for supplying a value of a second virtual border pixel,
computing a blocking artefact level on the basis of an absolute value of a difference between the values of the first and second virtual pixels.

Such a method of measuring blocking artefacts is much more economical in terms of computing resources than the prior-art methods. Indeed, it performs only a partial decoding of the data, namely an inverse discrete transform of one part only, the first row, of a block of encoded video data. Moreover, as will be described in greater detail hereinafter, the measuring method is very efficient because it is based on a rigorous mathematical approach.

It is also an object of the present invention to provide a device for measuring blocking artefacts, allowing the use of said method of measuring blocking artefacts in, for example, an integrated circuit, by means of hardware or software.

The invention also relates to a method of decoding video data, including such a method of measuring blocking artefacts, as well as the corresponding device.

The invention also relates to a method of encoding video data, including such a method of measuring blocking artefacts, as well as the corresponding device.

The invention finally relates to a method of transcoding video data, including such a method of measuring blocking artefacts, as well as the corresponding device.

BRIEF DESCRIPTION OF THE DRAWINGS

These aspects of the invention as well as other more detailed aspects will be more clearly apparent from the following description of several embodiments of the invention, given by way of non-limiting examples, and with reference to the accompanying drawings in which.

DESCRIPTION OF EMBODIMENTS

The present invention relates to a method of measuring blocking artefacts. It is applied to any video signal comprising video data which have been encoded and then decoded in accordance with a block-based encoding technique. In our example, the encoding technique is the MPEG standard, but it may be any other block-based encoding technique such as, for example, the standards H.261, H.263 or H.264 of the International Telecommunication Union (ITU), or the JPEG standard.

In the case of the MPEG standard, said blocks comprise 8 rows of 8 pixels. However, it will be evident to those skilled in the art that the invention is also applicable to blocks of a different size, such as blocks of 4 rows of 4 pixels used in, for example, the H.264 standard.

In the following description, the video data are preferably the luminance values of pixels constituting a digital image, but it will be evident to those skilled in the art that video data such as chrominance values may also be processed by the method of measuring blocking artefacts.

Moreover, the video data have been encoded by using a discrete cosine transform. However, it will also be evident to those skilled in the art that the invention is applicable to any equivalent discrete transform, notably the discrete transforms of the Fourier type.

The principle of the method of measuring blocking artefacts according to the invention, as well as its improvements and applications are elucidated in the description of the following Figures.

Figure 1:
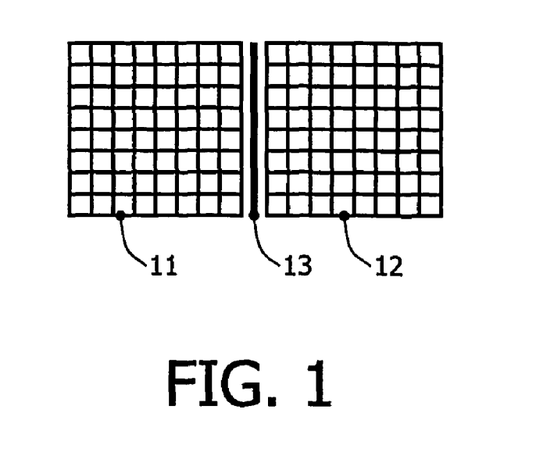
FIG. 1 shows a border between two adjacent blocks.

Let us consider two data blocks (11, 12) which are horizontally adjacent, as is shown in FIG. 1. These two blocks are separated by a block border (13). The present invention has for its object to determine the vertical blocking artefacts which could be present on this block border. The following demonstration is based on the detection of this vertical blocking artefact but it is not limited to this detection, because a horizontal blocking artefact may be detected in a similar manner, based on two vertically adjacent pixel blocks.

Figure 2:
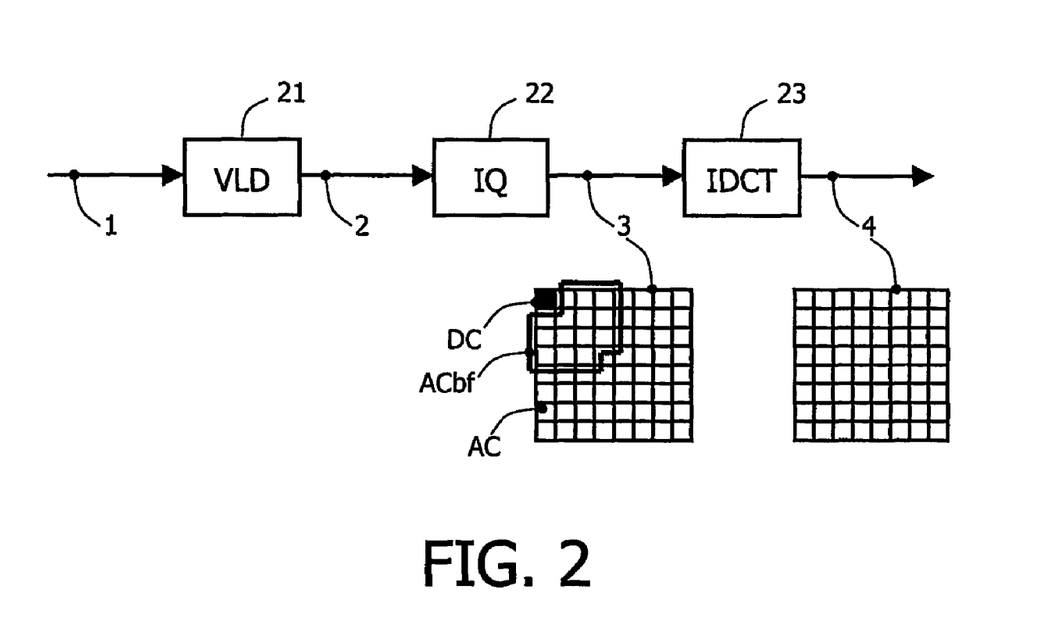
FIG. 2 describes a conventional decoding method.

FIG. 2 describes a conventional decoding method. Such a method is suitable for receiving a sequence of images encoded in the form of a series of blocks of encoded video data. The decoding method notably comprises the steps of:

variable-length decoding VLD (21) of blocks of encoded video data (1), suitable for supplying a block of quantized data (2), inverse quantization IQ (22) of blocks of quantized data (2), suitable for supplying blocks of transformed data (3), i.e. blocks of 64 DCT coefficients in our example, said block comprising a direct coefficient DC at the top right of the block indicating the average of the values of the pixels of said block, as well as frequency coefficients AC, inverse frequency transform, in our example an inverse discrete cosine transform IDCT (23), suitable for converting blocks of transformed data (3) into a block of inversely transformed data (4), i.e. blocks of pixels in our example.

A complete decoding in accordance with this method thus necessitates the computation of an inverse discrete cosine transform IDCT for 64 DCT coefficients, which computation constitutes the most complex part of the decoding method. The present invention has for its object to allow detection of blocking artefacts without realizing such a complex computation.

Figure 3:
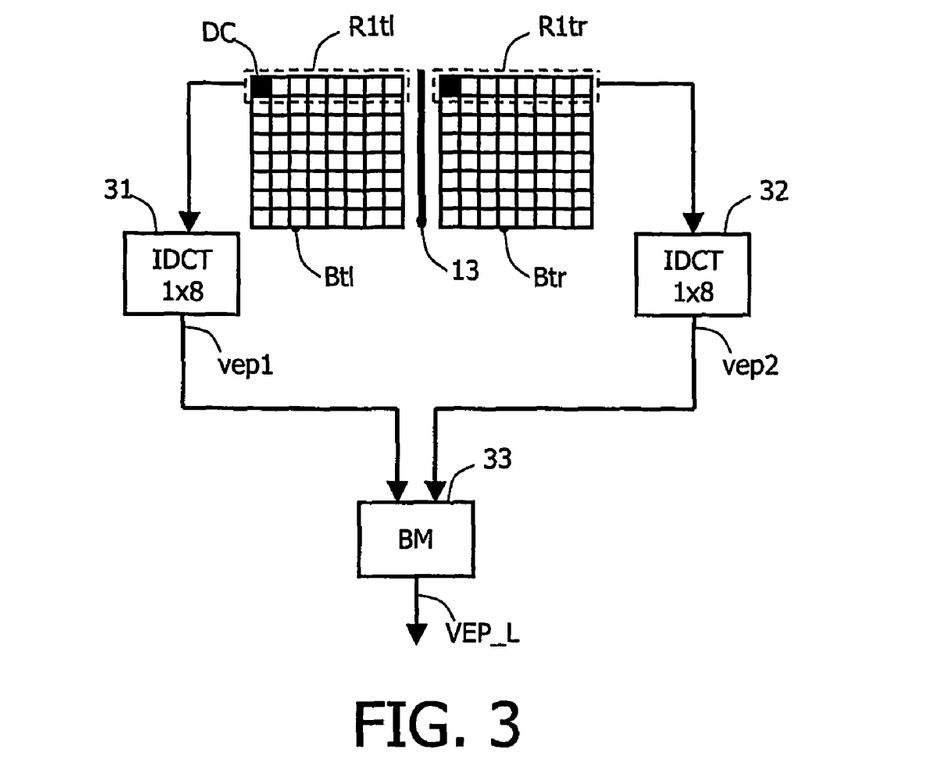
FIG. 3 describes the method of measuring blocking artefacts according to the invention.

FIG. 3 describes the method of measuring blocking artefacts according to the invention. Such a method comprises the steps of:

computing a monodimensional inverse discrete cosine transform IDCT1×8 (31) of the first horizontal row (R1tl) of a first block (Btl) of DCT coefficients situated at the left of the block border (13), at a point near said block border, resulting in a value of a first virtual border pixel (vep1), computing a monodimensional inverse discrete cosine transform IDCT1×8 (32) of the first horizontal row (R1tr) of a second block (Btr) of DCT coefficients situated at the right of the block border (13) and adjacent to the first block (Btl), at a point near said block border, resulting in a value of a second virtual border pixel (vep2), computing BM (33) of a blocking artefact level (VEP_L) on the basis of a difference between the values of the first and second virtual pixels.

Figure 4:
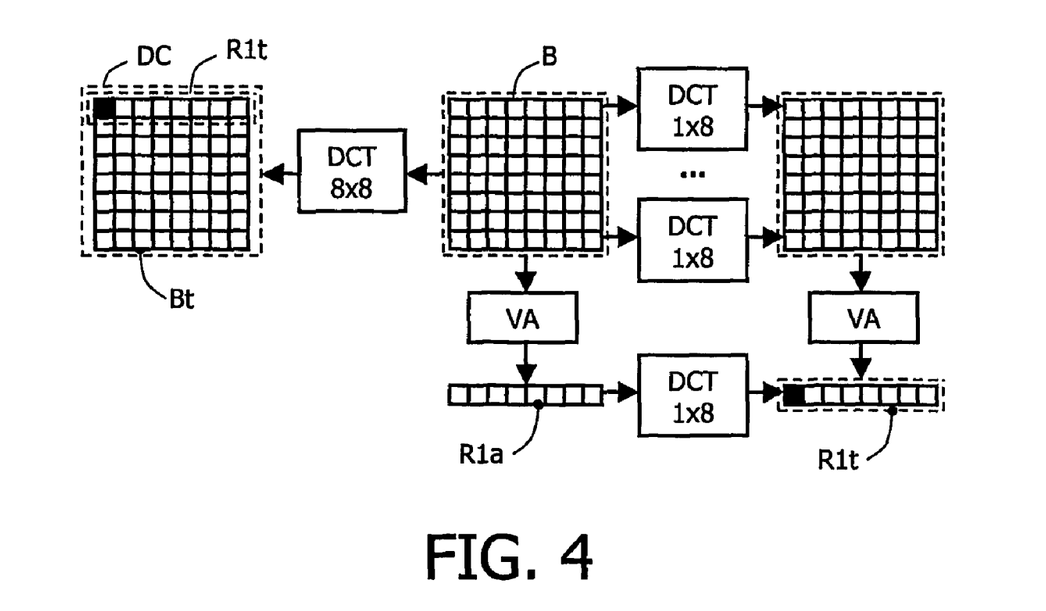
FIG. 4 illustrates the mathematical principle on which the invention is based.

The invention is based on the mathematical approach illustrated in FIG. 4. The value F of a DCT coefficient of position (u, v) within a block is defined on the basis of the corresponding block of pixels having values f(x, y), as follows:

$$F(u, v) = \frac{2 * C(u) * C(v)}{N} \sum_{u=0}^{N-1} \sum_{v=0}^{N-1} f(x, y) * \cos\left(\frac{\pi(2x+1)u}{2N}\right) * \cos\left(\frac{\pi(2y+1)v}{2N}\right)$$

with N=8 in our example, C(u) and C(v) being predetermined coefficients.

As the bidimensional discrete cosine transform is a linear transform, the first horizontal row (R1,t) of a block (Bt) of DCT coefficients obtained on the basis of said bidimensional discrete cosine transform DCT8×8 of the corresponding block (B) of pixels is thus the average value (VA) in accordance with a vertical direction of the data emanating from the monodimensional discrete cosine transforms DCT1×8 of 8 horizontal rows of the pixel block (B). This first horizontal row (R1t) corresponds to the horizontal variations within said block.

It is to be noted that the first horizontal row (R1t) of a block of DCT coefficients (Bt) may be obtained either from an average value (VA) in accordance with a vertical direction of the pixels of the block (B) followed by a DCT1×8 transform of the horizontal row (R1a) of the average values thus obtained, or from DCT1×8 transforms of each row of the pixel block followed by an average value (VA) in accordance with a vertical direction of the transformed data thus obtained. The direct coefficient DC is the first coefficient of the first horizontal row (R1t) thus obtained. The value of the virtual border pixel (vep) is, for example, the value of the pixel on the left or on the right of the row (R1a) of average values, according to whether the border of the block is on the left or on the right.

The present invention is based on the computation of this virtual border pixel. This virtual pixel is computed solely on the basis of 8 DCT coefficients in our example, instead of 64 DCT coefficients used for computing the real pixel. A virtual border pixel substantially corresponds to the average value of the pixels present along the block border, namely for the block situated on the left of the border, the average value of the pixels situated on its right edge and, for the block situated on the right of the border, the average value of the pixels situated on its left edge. Different methods are possible for computing the virtual border pixel.

In accordance with a first embodiment of the invention, the virtual pixels are determined on the basis of the monodimensional inverse discrete transforms IDCT1×8 of the first row (R1tl) of the block situated on the left of the vertical border (13) and the first row (R1tr) of the block situated on the right of said border at points corresponding exactly to the pixels which are nearest to the border, namely, in our example, R1al(7) for the left block, and R1ar(0) for the right block. Thus we have:

$$vep1 = R1al(7) = K\sum_{v=0}^{7} C(v) * R1tl(v) * \cos\left(\frac{15\pi v}{16}\right)$$

$$vep2 = R1ar(0) = K\sum_{v=0}^{7} C(v) * R1tr(v) * \cos\left(\frac{\pi v}{16}\right)$$

where K and C(v) are constants.

Figure 5:
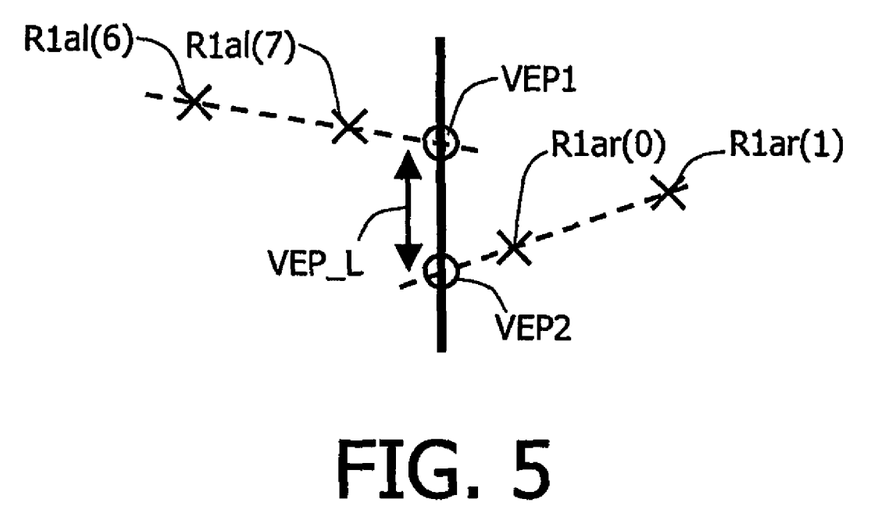
FIG. 5 illustrates a mode of determining virtual border pixels.

In accordance with a second embodiment of the invention, the virtual pixels are determined on the basis of the monodimensional inverse discrete cosine transform IDCT1×8 of a point corresponding exactly to the border between the first and second blocks. This embodiment, which is more sophisticated than the embodiment described hereinbefore, allows local variations to be taken into account. An example of this second embodiment is illustrated in FIG. 5 and allows computation of the value of the virtual border pixel vep1, at position 7,5 with respect to the left row, on the basis of a linear interpolation of intermediate data R1al(6) and R1al(7). A similar principle is used for computing the virtual border pixel vep2, at position −0.5 with respect to the right row, on the basis of a linear interpolation of intermediate data R1ar(0) and R1ar(1), being:

$$vep1 = \frac{1}{2}(3*R1al(7) - R1al(6)) = K\sum_{v=0}^{7} C(v)*R1tl(v)*Tl(v)$$

with $$Tl(v) = \frac{1}{2}\left[3*\cos\left(\frac{15\pi v}{16}\right) - \cos\left(\frac{13\pi v}{16}\right)\right]$$

$$vep2 = \frac{1}{2}(3*R1ar(0) - R1ar(1)) = K\sum_{v=0}^{7} C(v)*R1tr(v)*Tr(v)$$

with $$Tr(v) = \frac{1}{2}\left[3*\cos\left(\frac{\pi v}{16}\right) - \cos\left(\frac{3\pi v}{16}\right)\right]$$

If the coefficients Tl(v) and Tr(v) are stored in a look-up table LUT, the computation which is necessary for implementing this second embodiment has a complexity which is equivalent to the computation of the first variant. In a more general manner, the interpolation may be performed on a set of more than two values and is not necessarily linear; it may be, for example, polynomial.

Where the solution or solutions of the prior art necessitate at least for each block the decoding of 8 pixels along a border by using a bidimensional inverse discrete cosine transform, namely 8 times 64 multiplications and 64 additions for an 8×8 block, the present invention only requires the computation of a monodimensional inverse discrete cosine transform at a single point, namely 8 multiplications and 8 additions. Consequently, the invention is at least 64 times less complex than the known methods of measuring blocking artefacts, provided that the method of measuring blocking artefacts has access to streams of encoded video data.

When two virtual border pixels are determined, namely one for each of the two adjacent blocks, the method of measuring artefacts according to the present invention comprises a step of computing a blocking artefact level on the basis of the values of said virtual pixels. In accordance with an embodiment of the invention, the blocking artefact level (VEP_L) corresponds to the absolute value of the difference between the values of the first and second virtual pixels. These blocking artefact levels are added, for example, for each border of the horizontal and vertical block of an image, giving a global level of blocking artefacts VEP_Im per image, namely:

$$\text{VEP\_Im} = \sum_{rows} \text{VEP\_L}_V + \sum_{columns} \text{VEP\_L}_H$$

where VEP_L$_H$ represents an artefact level corresponding to a horizontal block border and VEP_L$_V$ represents an artefact level corresponding to a vertical block border.

In accordance with the preferred embodiment of the invention, a global level of blocking artefacts is computed for the images of the intra type, i.e. the images encoded without reference to any other image. In accordance with a first variant, this global blocking artefact level is considered to be representative of a set of blocking artefact levels for a group of pictures (GOP) comprising said intra image and at least one other image of a different type. In accordance with a second variant, the measurement of the global blocking artefact level is completed by measurements based on parameters relating to the other images of the group of pictures such as, for example the quantization steps used, the size of the motion vectors, or the number of bits which have been necessary to encode these images.

It is also possible to apply the method of measuring blocking artefacts to blocks of the intra type or to blocks having a zero motion vector, said blocks belonging to an image of the inter type, i.e. an image encoded with reference to at least one other image. In this case, the coincidence of blocking artefacts between the images of the intra and inter types is considered, for example, as a confirmation of the presence of said blocking artefacts, in which a weighting coefficient of more than 1 is applied to the level of corresponding blocking artefacts.

The method of measuring blocking artefacts may be improved in many ways, notably relating to considerations based on the human visual system.

In accordance with an embodiment of the invention, the method of measuring blocking artefacts takes the luminance masking effect into account, which causes the block effects to be less visible in the very bright zones and in the very dark zones of the image. The reference function which translates this property of the human visual system is shown diagrammatically in FIG. 6. This function (f) is described in detail in the article by H. R. Wu and M. Yuen, entitled "A generalized block-edge impairment metric for video coding" published in IEEE Signal Processing Letters, vol. 4, no. 11, pp. 317-320, November 1997. It shows the minimum difference of luminance values which are visible (ΔL) to a viewer as a function of the average luminance (AvgL) of a zone of the image, equal, for example, to the surface covered by a pair of adjacent blocks. This function passes through a minimum (ΔL0) equal to about 1 or 2 units, for an average value of the luminance which is equal to about 70 (L0) if the luminance is between 0 and Lmax=255.

Figure 6:
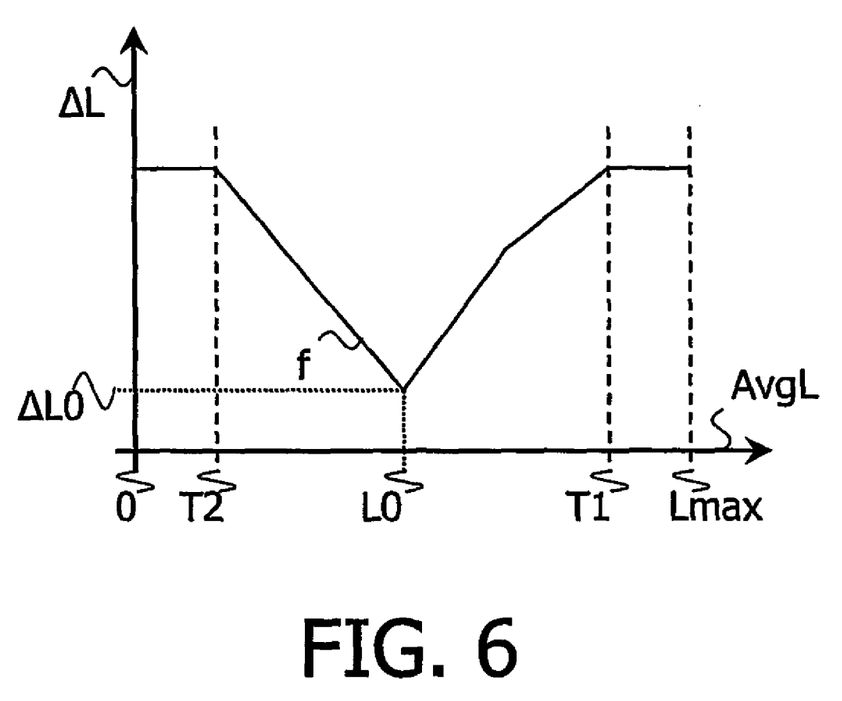
FIG. 6 shows the reference function corresponding to the luminance masking effect inherent in the human visual system, FIG. 7 diagrammatically shows the method of decoding video data according to the invention, FIG. 8 diagrammatically shows the method of encoding video data according to the invention.

In accordance with a first variant of this embodiment, if the average value of the luminance of a pair of adjacent blocks is above the reference function, the blocking artefact level (VEP_L) determined for this pair of blocks remains unchanged; if not, it is set to zero.

In accordance with a second variant of this embodiment, the blocking artefact level (VEP_L) determined for a pair of adjacent blocks is weighted as a function of the average luminance (AvgL) of the pair of blocks, the weighting being maximum for an average luminance value which is equal to about 70 and minimum for an average luminance value which is equal to 0 or 255 in our example.

In accordance with another embodiment of the invention, the method of measuring blocking artefacts takes the texture masking effect into account, which causes the block effects to be more visible in the uniform zones of the image than in the textured zones. To this end, the method of measuring blocking artefacts according to the invention comprises a step of computing the energy E of the frequency coefficients AC of the DCT coefficient blocks by taking into account the low-frequency coefficients ACbf such as those represented in FIG. 2, for example, i.e.:

$$E\ [ACbf] = \sum_{i=1}^{fmax} |ACbf\ (i)| \text{ or, alternatively,}$$

$$E\ [ACbf] = \sum_{i=1}^{fmax} |ACbf\ (i)|^2$$

where fmax is the maximum frequency taken into account in the computation of the energy of a block. If the energy of a pair of adjacent blocks is less than a first threshold T1, the zone is quasi uniform and the blocking artefact level (VEP_L) associated with the border between the two adjacent blocks is weighted by a higher weighting coefficient c1, for example, higher than 1. If the energy of a pair of adjacent blocks is more than the first threshold T1 and less than a second threshold T2, the zone is less textured and the level of blocking artefacts associated with the border between the two adjacent blocks is weighted by a smaller weighting coefficient c2, for example, equal to 1. Finally, if the energy of a pair of adjacent blocks is more than the second threshold T2, the zone is textured and the blocking artefact level associated with the border between the two adjacent blocks is weighted by an even smaller weighting coefficient c3, for example, less than 1, because the blocking artefacts are less visible in these zones.

In accordance with another embodiment of the invention, the method of measuring blocking artefacts takes the number of borders of neighboring blocks into account. For example, if a horizontal border of the block is adjacent to a vertical border of the block so that a corner is formed and if the blocking artefact levels associated with these borders are higher than a predetermined threshold Tmin1, said blocking artefact levels are weighted by a weighting coefficient c which is higher than 1. In accordance with another example, if other block borders are consecutive in accordance with a given direction and if each of them has a blocking artefact level which is higher than a predetermined threshold Tmin2, said blocking artefact levels are weighted by a weighting coefficient c' which is higher than 1.

In accordance with another embodiment of the invention, the method of measuring blocking artefacts comprises a step of detecting natural contours. For example, the blocking artefact level of a border is compared with a predetermined threshold Tmax, equal to, for example, 30. If the blocking artefact level is higher than this predetermined threshold Tmax, the value of the blocking artefact level is set to zero because it is a natural contour which has been detected. In accordance with another example, the predetermined threshold Tmax is weighted as a function of the quantization steps associated with the blocks on both sides of the border.

The method of measuring blocking artefacts may be used in, for example, an integrated circuit, by means of hardware or software or a combination of them.

In an example of a hardware implementation, the device for measuring blocking artefacts comprises circuits each realizing a step of the method of measuring blocking artefacts as described hereinbefore, in which the circuits for computing the inverse discrete cosine transform IDCT are notably known to those skilled in the art. Said device comprises:
  means for computing a monodimensional inverse discrete transform of a first row, horizontal or vertical, of a first block of encoded video data, suitable for supplying a value of a first virtual border pixel,
  means for computing a monodimensional inverse discrete transform of a first row, horizontal or vertical, of a second block of encoded video data, the second block being horizontally or vertically adjacent to the first block, suitable for supplying a value of a second virtual border pixel,
  a computing unit, for example, a processor suitable for computing a blocking artefact level on the basis of a difference between the values of the first and second virtual pixels.

It is also possible to implement the steps of the method of measuring blocking artefacts by means of a suitably programmed circuit. A set of instructions in a programming memory may cause the circuit to perform the different steps of the method of measuring blocking artefacts as described hereinbefore. The set of instructions may also be loaded into the programming memory by reading a common data carrier, for example, a disc comprising the set of instructions. Reading may also be performed by means of a common communication network, for example, the Internet. In this case, a service provider supplies the set of instructions to those interested.

The method of measuring blocking artefacts finds numerous applications, such as decoding or decompression of encoded video data, encoding or compressing video data, and transcoding encoded video data, such a transcoding allowing, for example, elastic storage of encoded video data on a disc.

Figure 7:
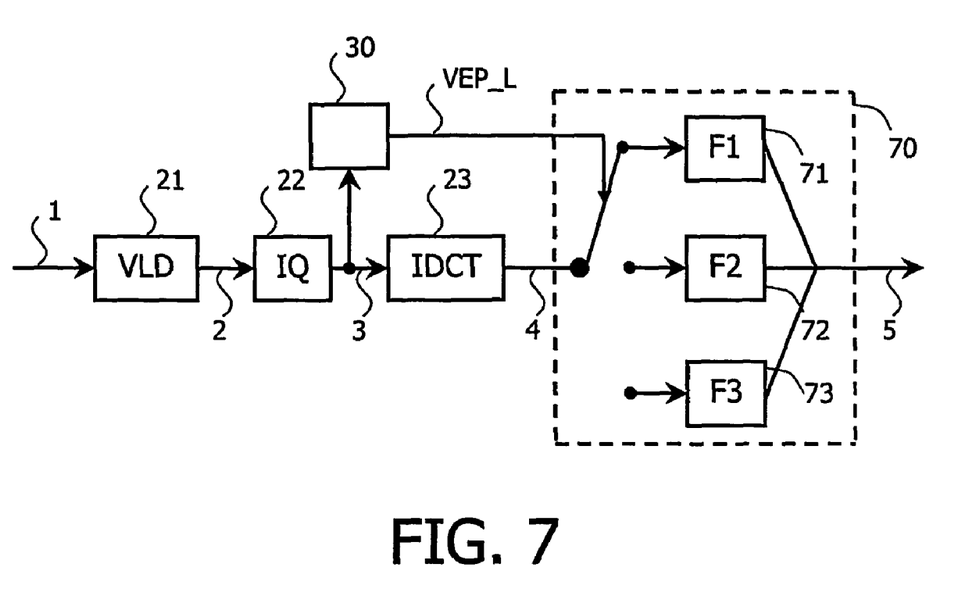

A method of decoding video data according to the invention is described with reference to FIG. 7. This method notably comprises the steps of:
  variable-length decoding VLD (21) of blocks of encoded video data (1), suitable for supplying blocks of quantized data (2),
  inverse quantization IQ (22) of blocks of quantized data (2) suitable for supplying blocks of transformed data (3), i.e. blocks of 64 DCT coefficients in our example,
  inverse discrete cosine transform IDCT (23), suitable for converting blocks of transformed data (3) into blocks of inversely transformed data (4), i.e. blocks of pixels in our example,
  measuring blocking artefacts (30) as described hereinbefore, suitable for realizing a horizontal and/or vertical card of blocking artefact levels (VEP_L) on the basis of blocks of transformed data (3),
  filtering (70) suitable for applying a filter among a set of filters (71, 72, 73) for a set of pixels on both sides of a border between two blocks in accordance with the blocking artefact level (VEP_L) associated with this border, resulting in a filtered image (5).

In an embodiment of the invention, three filtering types have been defined. A light filter is used for a blocking artefact level which is lower than a first predetermined threshold TR1. A stronger filtering is applied for a blocking artefact level between the first predetermined threshold TR1 and the second predetermined threshold TR2. Finally, a filtering which is even stronger is used for a blocking artefact level which is higher than the second predetermined threshold TR2. Preferably only the pixels along a block border are filtered. It will be apparent to those skilled in the art that another division of the range of blocking artefact levels, as well as another choice of filters is possible.

In accordance with another embodiment, the decoding method also comprises a step of enhancing the contour, said step being deactivated if a blocking artefact level between a minimal boundary and a maximal boundary has been detected in the measuring step, such that a blocking artefact is not enhanced.

The present invention also relates to the video decoder allowing use of said decoding method.

Figure 8:
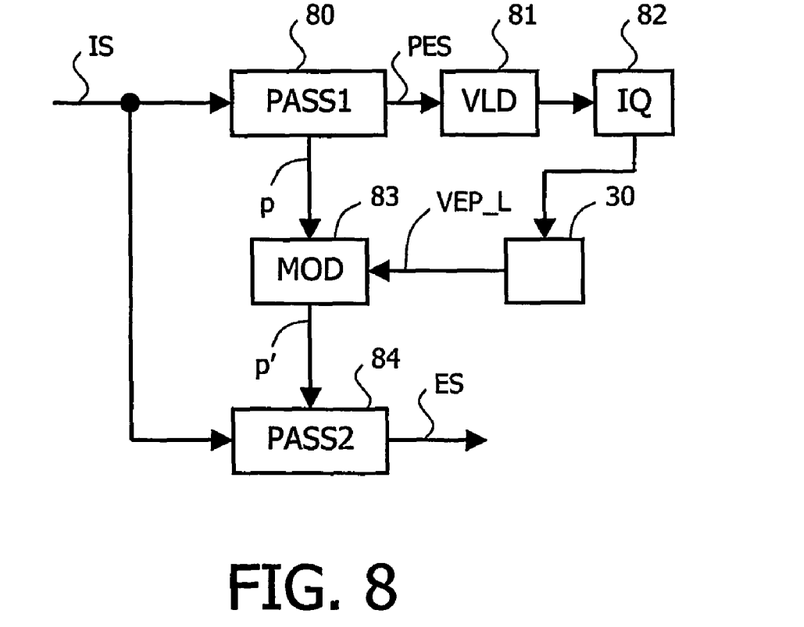

A method of encoding video data according to the invention is also described in FIG. 8. It comprises a step of pre-encoding PASS1 (80) pixel blocks (IS) corresponding to an image, said step being performed with a quantization step q which is constant for all the blocks of the image in accordance with a principle which is known to those skilled in the art and is described in, for example, European patent application no. 1 082 855. An intermediate stream of pre-encoded video data (PES) and pre-encoding parameters (p) such as, for example, the number of bits used for pre-encoding the blocks of the image results from this pre-encoding step.

According to the present invention, the encoding method also comprises the steps of:
  partially decoding intermediate streams of pre-encoded video data (PES), said step comprising, in cascade, the sub-steps of variable-length decoding VLD (81) and inverse quantization IQ (82) suitable for supplying blocks of transformed data,
  measuring blocking artefacts (30) as described hereinbefore, suitable for realizing a horizontal and/or vertical card of blocking artefact levels (VEP_L) on the basis of blocks of transformed data,
  modifying MOD (83) one or several pre-encoding parameters (p) corresponding to a block of pixels in accordance with a blocking artefact level associated with said block, this level being, for example, the average value of the blocking artefact levels associated with 4 virtual border pixels possible for a block, namely the left, right, upper and lower pixels, said step supplying one or more modified pre-encoding parameters (p').

These modified pre-encoding parameters are subsequently used during the step of encoding PASS2 (84) pixel blocks (IS), which supplies a final stream of encoded video data (ES) in accordance with a principle known to those skilled in the art.

In an embodiment of the invention, the pre-encoding parameter is the complexity $X(i,j)$, equal to the product of the quantization step by the number of bits used for the encoding operation, and corresponding to a block at position (i,j) in the image. This complexity is modified as follows, resulting in a modified complexity $X'(i,j)$:

$$X'(i,j)=C(VEP\_L(i,j))*X(i,j)$$

where C is a coefficient which depends on the blocking artefact level VEP_L(i,j).

Figure 9:
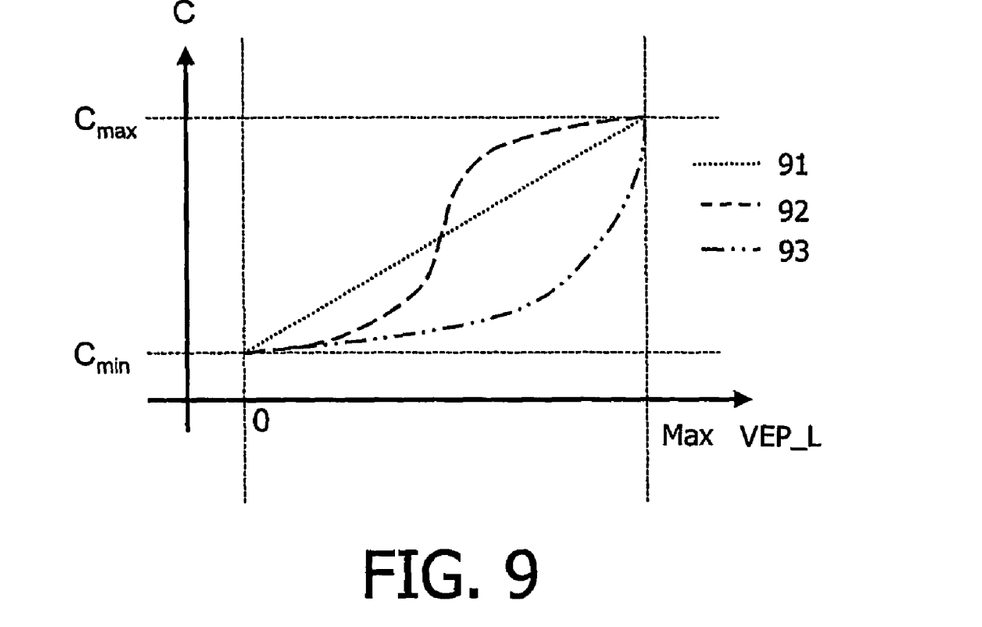
FIG. 9 shows three examples of modifying a pre-encoding parameter in accordance with said method of encoding video data.

FIG. 9 shows three examples of variations of the coefficient C as a function of the blocking artefact level (VEP_L), one linear variation (91) and two non-linear variations (92, 93) between two boundaries Cmin and Cmax equal to, for example, 1 and 2, respectively.

The encoding of an image of the intra type is thus improved and the encoding of images which follow this intra image in a group of pictures GOP is also improved in cascade.

The present invention also relates to the video encoder allowing use of said encoding method.

Figure 10:
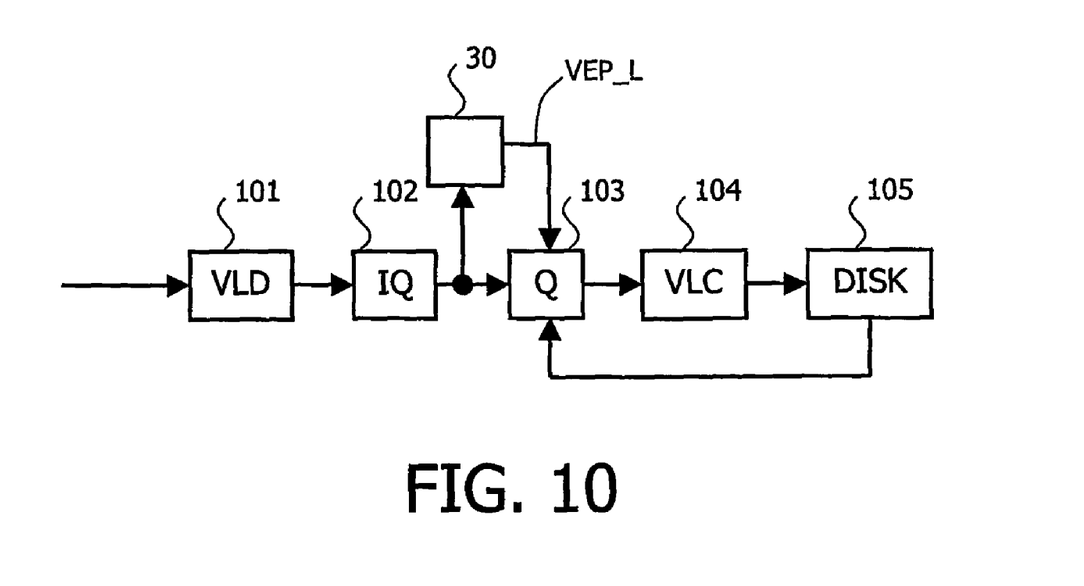
FIG. 10 shows diagrammatically the method of transcoding video data according to the invention.

A method of transcoding video data according to the invention is described with reference to FIG. 10. It notably comprises the steps of:
  variable-length decoding VLD (101) of the blocks of encoded video data, suitable for supplying blocks of quantized data,
  inverse quantization IQ (102) of the blocks of quantized data, suitable for supplying blocks of transformed data, blocks of 64 DCT coefficients in our example, which inverse quantization is performed with a first quantization step Q1,
  measuring blocking artefacts (30) as described hereinbefore, suitable for realizing a horizontal and/or vertical card of blocking artefact levels (VEP_L) on the basis of blocks of transformed data,
  quantization Q (103) of blocks of transformed data, suitable for supplying blocks of quantized data, the quantization being performed with a second quantization step Q2,
  variable-length coding VLC (104) of the blocks of quantized video data, suitable for supplying blocks of encoded data,
  storage DISK (105) of blocks of encoded data on a record carrier of, for example, the hard disk type.

The value of the second quantization step Q2 of a block during the process is a function of the space which is available on the disk, as well as of the value of a blocking artefact level associated with said block.

In an embodiment of the invention, the stream of encoded video data has a scalable structure, i.e. it comprises a base layer and enhancement layers. In accordance with the space available on the disk and the blocking artefact level, it is possible to store or not store one or several enhancement layers so as to preserve a good compromise between the visual quality of the stored stream, quantitatively represented by the measurement of the blocking artefact level in conformity with the present invention, and the space which is still available on the disk.

The present invention also relates to the video transcoder allowing use of said transcoding method.

Any reference sign between parentheses in the present text should not be construed as limiting the claim. Use of the verb "comprise" and its conjugations does not exclude the presence of elements or steps other than those stated in the claims. Use of the article "a" or "an" preceding an element or step does not exclude the presence of a plurality of such elements or steps.

The invention claimed is:

1. A method of measuring blocking artefacts on the basis of video data encoded in accordance with a block-based encoding technique, the method comprising the steps of:
  computing a mono-dimensional inverse discrete transform of a first row of a first block of encoded video data, suitable for supplying a value of a first virtual border pixel;
  computing a mono-dimensional inverse discrete transform of a first row of a second block of encoded video data, the second block being adjacent to the first block, suitable for supplying a value of a second virtual border pixel; and computing a blocking artefact level on the basis of an absolute value of a difference between the values of the first and second virtual pixels.

2. A method of measuring blocking artefacts as claimed in claim 1, wherein the virtual border pixels are determined at a point corresponding to a border between the first and second blocks.

3. A method of measuring blocking artefacts as claimed in claim 1, wherein the virtual border pixels are determined at points corresponding to the nearest pixel on both sides of a border between the first and second blocks.

4. A method of measuring blocking artefacts as claimed in claim 1, wherein the computation of a level of blocking artefacts is weighted by a weighting coefficient which is a function of the properties of the human visual system.

5. A method of encoding video data in the form of blocks, the method comprising the steps of:
   pre-encoding a set of video data blocks suitable for supplying an assembly of pre-encoded data blocks and pre-encoding parameters;
   partially decoding the set of pre-encoded data blocks, suitable for supplying transformed data blocks;
   measuring blocking artefacts, suitable for supplying blocking artefact levels based on transformed data blocks, the measuring comprising,
      computing a mono-dimensional inverse discrete transform of a first row of a first block of encoded video data, suitable for supplying a value of a first virtual border pixel,
      computing a mono-dimensional inverse discrete transform of a first row of a second block of encoded video data, the second block being adjacent to the first block, suitable for supplying a value of a second virtual border pixel, and
      computing a blocking artefact level on the basis of an absolute value of a difference between the values of the first and second virtual pixels;
   modifying the pre-encoding parameter of a block in accordance with a blocking artefact level associated with said block, suitable for supplying a modified pre-encoding parameter; and
   encoding the assembly of video data based on modified pre-encoding parameters.

6. A method of decoding encoded data blocks, the method comprising the steps of:
   partially decoding the encoded data blocks, suitable for supplying transformed data blocks;
   inverse discrete transform suitable for converting transformed data blocks into inversely transformed data blocks;
   measuring blocking artefacts, suitable for supplying blocking artefact levels based on transformed data blocks, the measuring comprising,
      computing a mono-dimensional inverse discrete transform of a first row of a first block of encoded video data, suitable for supplying a value of a first virtual border pixel,
      computing a mono-dimensional inverse discrete transform of a first row of a second block of encoded video data, the second block being adjacent to the first block, suitable for supplying a value of a second virtual border pixel, and
      computing a blocking artefact level on the basis of an absolute value of a difference between the values of the first and second virtual pixels; and
   filtering suitable for applying a filter among a set of filters for an assembly of inversely transformed data on both sides of a border between two blocks in accordance with the blocking artefact level associated with said border.

7. A method of transcoding encoded data blocks, the method comprising the steps of:
   partially decoding encoded data blocks, suitable for supplying transformed data blocks with which a first quantization step is associated;
   measuring blocking artefacts, suitable for supplying blocking artefact levels based on transformed data blocks, the measuring comprising,
      computing a mono-dimensional inverse discrete transform of a first row of a first block of encoded video data, suitable for supplying a value of a first virtual border pixel,
      computing a mono-dimensional inverse discrete transform of a first row of a second block of encoded video data, the second block being adjacent to the first block, suitable for supplying a value of a second virtual border pixel, and
      computing a blocking artefact level on the basis of an absolute value of a difference between the values of the first and second virtual pixels;
   partially encoding transformed data blocks, suitable for supplying encoded data blocks, with which a second quantization step is associated; and
   storing encoded data blocks in a storage unit, the value of the second quantization step of a block being a function of a space available in the storage unit as well as of a value of an artefact level of said block.

8. A device for measuring blocking artefacts based on encoded video data in accordance with a block encoding technique, the device comprising:
   means for computing a mono-dimensional inverse discrete transform of a first row of a first block of encoded video data, suitable for supplying a value of a first virtual border pixel,
   means for computing a mono-dimensional inverse discrete transform of a first row of a second block of encoded video data, the second block being adjacent to the first block, suitable for supplying a value of a second virtual border pixel,
   a computing unit suitable for computing a blocking artefact level on the basis of an absolute value of a difference between the values of the first and second virtual pixels.

9. A video encoder of data in the form of blocks, the video encoder comprising:
   means for pre-encoding a set of video data blocks suitable for supplying an assembly of pre-encoded data blocks and pre-encoding parameters;
   means for partially decoding the set of pre-encoded data blocks, suitable for supplying transformed data blocks;
   a device for measuring blocking artefacts, suitable for supplying blocking artefact levels based on transformed data blocks, the device comprising,
      means for computing a mono-dimensional inverse discrete transform of a first row of a first block of encoded video data, suitable for supplying a value of a first virtual border pixel,
      means for computing a mono-dimensional inverse discrete transform of a first row of a second block of encoded video data, the second block being adjacent to the first block, suitable for supplying a value of a second virtual border pixel, and
      a computing unit suitable for computing a blocking artefact level on the basis of an absolute value of a difference between the values of the first and second virtual pixels;

a unit for computing a modified pre-encoding parameter based on the pre-encoding parameter of a block and a blocking artefact level associated with said block; and means for encoding the assembly of video data on the basis of modified pre-encoding parameters.

10. A video decoder of encoded data blocks, comprising:

means for partially decoding encoded data blocks, suitable for supplying transformed data blocks;

means for inverse discrete transform, suitable for converting transformed data blocks into inversely transformed data blocks;

a device for measuring blocking artefacts, suitable for supplying blocking artefact levels based on transformed data blocks, the device comprising, means for computing a mono-dimensional inverse discrete transform of a first row of a first block of encoded video data, suitable for supplying a value of a first virtual border pixel, means for computing a mono-dimensional inverse discrete transform of a first row of a second block of encoded video data, the second block being adjacent to the first block, suitable for supplying a value of a second virtual border pixel, and a computing unit suitable for computing a blocking artefact level on the basis of an absolute value of a difference between the values of the first and second virtual pixels; and a filtering unit, suitable for applying a filter among a set of filters for an assembly of inversely transformed data on both sides of a border between two blocks in accordance with the blocking artefact level associated with said border.

11. A video transcoder of encoded data blocks, comprising:

means for partially decoding encoded data blocks, suitable for supplying transformed data blocks with which a first quantization step is associated;

a device for measuring blocking artefacts, suitable for supplying blocking artefact levels based on transformed data blocks, the device comprising, means for computing a mono-dimensional inverse discrete transform of a first row of a first block of encoded video data, suitable for supplying a value of a first virtual border pixel, means for computing a mono-dimensional inverse discrete transform of a first row of a second block of encoded video data, the second block being adjacent to the first block, suitable for supplying a value of a second virtual border pixel, and a computing unit suitable for computing a blocking artefact level on the basis of an absolute value of a difference between the values of the first and second virtual pixels;

means for partially decoding transformed data blocks, suitable for supplying encoded data blocks, with which a second quantization step is associated;

a unit for storing encoded data blocks; and a computing unit suitable for computing the value of the second quantization step of a block on the basis of a space available in the storage unit and of a value of a blocking artefact level associated with said block.

12. A computer program stored on a computer-readable medium suitable for performing the method of measuring blocking artefacts as claimed in claim 1, when said program is executed by a processor.

\* \* \* \* \*